United States Patent [19]

Wilson, Jr.

[11] 4,063,002
[45] Dec. 13, 1977

[54] INSULATED GLASS AND SEALANT THEREFOR

[76] Inventor: Floyd Wilson, Jr., R.D. 1 Box 434A Pleasant Valley Road, Titusville, Mercer County, N.J. 05860

[21] Appl. No.: 675,084

[22] Filed: Apr. 8, 1976

Related U.S. Application Data

[63] Continuation-in-part of Ser. No. 567,486, April 14, 1975, abandoned.

[51] Int. Cl.$^2$ ............................................. B32B 9/04
[52] U.S. Cl. ............................ 428/411; 260/28.5 A; 260/28.5 AS; 260/28.5 B; 260/28.5 C; 260/31.8 M; 260/31.8 DR; 260/31.8 G; 260/31.8 H; 260/31.8 HR; 260/33.6 UA; 260/33.6 UB; 260/33.6 R; 260/823; 260/858; 260/859 R; 260/874; 260/875
[58] Field of Search ............... 260/823, 858, 859 R, 260/874, 875, 897 R, 897 B, 28.5 AS, 28.5 A, 28.5 B, 28.5 C, 31.8 M, 31.8 DR, 31.8 G, 31.8 H, 31.8 HR, 33.6 UA, 33.6 UB, 33.6 R; 428/34, 411, 426, 425

[56] References Cited

U.S. PATENT DOCUMENTS

| | | | |
|---|---|---|---|
| 3,062,771 | 11/1962 | Boenau et al. | 260/28 |
| 3,354,105 | 11/1967 | Trieschock | 260/28 |
| 3,427,366 | 2/1969 | Verdol et al. | 260/859 |
| 3,637,558 | 1/1972 | Verdol et al. | 260/28 |
| 3,835,077 | 9/1974 | Mori et al. | 260/28 |
| 3,842,024 | 10/1974 | Rieux et al. | 260/28 |
| 3,878,157 | 4/1975 | Olstowski | 260/28 |

*Primary Examiner*—Melvyn I. Marquis
*Attorney, Agent, or Firm*—Synnestvedt & Lechner

[57] ABSTRACT

A specially formulated plasticized cured polyurethane or cured polyether composition which has a combination of properties that make it suitable for use as a sealant for insulated glass, such properties including a very low moisture vapor transmission rate, elongation of at least about 100%, low volatility and excellent adhesion to glass.

23 Claims, No Drawings

INSULATED GLASS AND SEALANT THEREFOR

CROSS-REFERENCE TO RELATED APPLICATION

This is a continuation-in-part of U.S. patent application Ser. No. 567,486, filed Apr. 14, 1975, now abandoned.

FIELD OF THE INVENTION

This invention relates to a composition which has a combination of properties which makes it particularly useful for use as a sealant for insulated glass.

The term "insulated glass" broadly refers to a structure comprising panes of glass, the faces of which are in spaced relationship, thereby providing between the glass panes a space which imparts insulating properties to the structure. In its most widely used form, 2 parallel panes of glass are positioned in spaced relationship by metallic spacers positioned around the perimeters of the panes, and indented a short distance from the edges of the panes, thereby forming a U-shaped channel in which the legs of the U comprise the interior surface edges of the panes and the base of the U comprises a side of the spacer. In typical form, the spacer is a hollow member filled with a water-absorbant material, for example, a molecular sieve, for keeping the enclosed air space between the glass panes dry. In such a structure, the aforementioned U-shaped channel is filled with a sealant, generally a polymeric-based composition, which must have a combination of properties for satisfactory use.

Required properties of a satisfactory sealant are discussed below.

The sealant must have a very low moisture vapor transmission (MVT) rate so that moisture is prevented from entering the dry space between the panes of glass. The presence of moisture in the space tends to reduce the insulating value thereof. Moisture in the space can also condense on the panes of glass and create visibility or aesthetic problems. It should be appreciated that if the sealant does not have a satisfactory low MVT rate, the absorbing capacity of the water-absorbent material in the hollow spacer will be exceeded, and moisture will find its way into the space.

Another property of the sealant is that it should form an excellent bond with glass which is not degraded over long periods of time under use conditions, which generally include exposure to sunlight, moisture and large changes in temperature.

In addition, the sealant itself must not be a source of a material which enters the space between the panes of glass and causes fogging thereof. For example, if under the conditions of use, one or more constituents comprising the sealant volatize into the space, fogging, often referred to as "chemical fogging" of the glass panes is encountered.

In addition, the sealant should have good elongation or flexibility properties so that it gives during contraction and expansion of the insulated glass structure. Changes in temperature will tend to cause this. Accordingly, the sealant should have an elongation of at least about 100%, and preferably an elongation of at least about 200%.

The sealant should also resist being degraded when contacted with conventional caulks and putties.

The present invention relates to a composition having a combination of properties which make it ideally suited for use as a sealant for insulated glass.

REPORTED DEVELOPMENTS

At present, the most widely used insulated glass sealants are prepared from polysulfide liquid polymers, selected plasticizers, and glass adhesion promoters such as silanes. Examples of plasticizers used in such sealants are high boiling phthalates and chlorinated paraffins. In the past, chlorinated biphenols were used as plasticizers in polysulfide-based sealants. Speaking generally, the aforementioned type sealant is applied in liquid form and then cured by the use of a curing agent such as manganese dioxide.

A serious disadvantage of the aforementioned polysulfide-based sealant is its relatively high cost.

The use of polymers other than polysulfides for glass insulated sealants has been reported. For example, U.S. Pat. No. 3,372,083 discloses an insulated glass sealant which is the cured reaction product of:

A. an isocyanate terminated prepolymer; and
B. an isocyanate adduct of a bituminous substance containing asphaltene or tar-like compounds.

Although compositions within the scope of this patent have been used satisfactorily in certain applications, it is believed that they have not been used commercially as sealants for insulated glass because they lack one or more of the properties referred to above.

Accordingly, it is an object of this invention to provide a composition which has a combination of properties which make it effective for use as a sealant for insulated glass.

SUMMARY OF THE INVENTION

In accordance with this invention, there is provided a composition comprising a plasticized cured polyurethane or a plasticized cured polyether having a moisture vapor transmission rate, as measured by a heat-accelerated MVT test (described in detail below), of no greater than about 1 g per day, an elongation of at least about 100%, and low volatility properties. Conventional glass-adhesive improvers can be added to the above composition to provide a sealant which forms an excellent bond with glass and metal, and a bond which resists degradation over years of use under the various conditions to which insulated glass is exposed.

As will be described in detail below, it has been found in accordance with this invention that either of the aforementioned polymers can be combined with various modifying materials, referred to herein as "plasticizing materials", and other additives to form compositions which have properties required of satisfactory sealants for insulated glass.

One of the significant advantages of the present invention is that relatively low-cost ingredients can be used in preparing the sealant without sacrificing any of the various properties that satisfactory sealants must have. Indeed, sealants within the scope of the present invention have properties that exceed industry accepted standards.

It is noted that polysulfide-based sealants have been the only curable insulated glass sealants in commercial use for about 15 years. The characteristics of such sealants which have led to this use are: a low MVT; the ability to be applied in the form of a liquid which cures to a rubbery seal; the ability to adhere to glass and aluminum when adhesion promotors are added; and the capability of retaining this adhesion when the insulated glass unit is subject to a reasonable cycle of weathering, moisture exposure and ultraviolet light exposure.

Although urethane polymers and polyethers have been available during the aforementioned period of time, they have never qualified as glass sealants due to several deficiencies. Sealants based on such polymers have poor adhesion to many substrates, do not have as low an MVT as polysulfide-based sealants, are more hydrolysis prone, and do not have the adhesion retention required to maintain the desired long term seal of the insulated glass units.

Sealed Insulated Glass Manufacturer's Association, the industry association referred to as "SIGMA", has generated a simulated weather cycling test, covering three months of testing, which has been established as the standard of performance for finished units and for the sealants used. Most common urethane polymers based on polyether polyols have a compounded MVT 2-3 times higher than polysulfides, are subject to hydrolysis and weathering degradation and do not allow the units to pass through the SIGMA test cycle with the required retention of seal, low inner unit moisture and the minimum dew point limit and standard. Until the sealant of this invention passed the test, it is believed that no other polyurethane-based polymer met the full requirements to obtain SIGMA certification.

By way of example, under one user's test cycle, where polysulfide-based sealants usually last 8 weeks before failure and their lasting 10 weeks is unusual, and where one manufacturer's sealant lasts for only 4 weeks, the sealant of the present invention lasted for 12 weeks with no drop in dew point. This excellent performance contrasts to a drop in dew points for polysulfide-based sealants from $-94°$ F to $0°$ F (test failure) usually in 8 weeks.

In effect, the present invention involves converting what is normally regarded as a poor weathering polymer into a superior sealant with outstanding properties for insulated glass units which are subjected during their lives to difficult weathering cycles.

DETAILED DESCRIPTION OF THE INVENTION

In evaluating properties of compositions described below, the following evaluation tests were used.

TESTS

MVT Rate Test

A sample of the composition to be tested is prepared in the form of a disk about 4 inches in diameter and 60 mils thick. The open end of a one quart can filled with 200 g of water is tightly covered with the test sample using a polyurethane adhesive. The can is placed in an oven having a temperature of 135°–140° F. At various time intervals of at least a day, the amount of water which evaporates from the can through the test sample is determined by weighing. Results are reported in weight of water lost per day. A test sample having an MVT rating of 1 gram of water per day or less is considered to have satisfactory moisture vapor transmission properties for use as a sealant for insulated glass. An MVT rating in excess of about 1 g of water per day is considered to be unsatisfactory. This test correlates well with other standard tests.

ELONGATION TEST

A sample of the composition to be tested in the form of a strip having a thickness of about 60 mils, a width of about ½ inch and a length of about 1 inch is placed on a ruler and held at one end while the other end is pulled until the strip tears. The percent of elongation is determined by dividing the difference between the length of the stretched strip and the original length of the strip by the original length of the strip and multiplying the quotient by 100. A test sample having an elongation of 100% or more is considered to have satisfactory elongation properties for use as a sealant. If the strip tears before it is stretched to twice its length, that is, the elongation of the sample is less than 100%, it has properties which are considered to be unsatisfactory for use as a sealant in insulated glass.

VOLATILITY TESTS

A sample of the composition is applied to a small scale model of insulated glass, the structure of which consists of 2 panes of glass, about 4 inches × 4 inches, separated by a metallic spacer about ⅜ inch in width and positioned around the entire perimeter of the glass panes, about ⅜ inch from the edges thereof. The insulated glass is placed in an oven having a temperature of about 180° F for a 12 day period. The cured composition has satisfactorily low volatility properties if no fogging of the inside surfaces of the glass panes occurs during the 12 day period. If fogging occurs, the composition is not satisfactory.

Another test utilized to evaluate the volatility properties of the cured composition consists of partially submerging the insulated glass model in a pan of cold water and shining a sun lamp on the exposed portion of the model from a distance of about 6 inches. The cured composition has satisfactorily low volatility properties if no fogging or condensate appears on the inside surfaces of the glass panes within a period of 2 days. If fogging or condensate appears on the inside surfaces of the glass panes prior to the expiration of a 2 day period, the cured composition does not have satisfactory volatility properties.

When the term "low volatility" is used herein in connection with the cured composition, it means that the cured composition has satisfactorily low volatility properties as determined by the aforementioned tests.

INGREDIENTS OF COMPOSITION

The composition of the present invention includes either a cured plasticized polyurethane or a cured plasticized polyether polymer. As will be discussed in detail below, the specific materials used in plasticizing the polymers will depend on the specific properties of the cured polyurethane or cured polyether polymer that is used. There follows immediately below a detailed description of the aforementioned polymers that can be used, and thereafter a detailed description of other materials comprising the composition. Thereafter, guidelines are set forth as to the use of particular combinations of the polymers and other materials.

POLYURETHANE

The cured polyurethane constituent of the composition of the present invention is the reaction product of an organic polyisocyanate and polyol or the cured reaction product of a prepolymer containing free -NCO groups.

The polyisocyanate reactant for use in the practice of the present invention is any material which contains two or more NCO groups in the molecule. The polyisocyanate can be an aliphatic or aromatic polyisocyanate including, for example, cycloaliphatic, aryl, aralkyl, and alkaryl polyisocyanates. As will be explained in detail below, it can also be a higher molecular weight adduct or reaction product prepared by reacting an excess of a polyisocyanate with a polyfunctional compound containing active hydrogen, such adducts or reaction products generally being referred to as prepolymers.

Examples of aliphatic polyisocyanates which can be used are: ethylene diisocyanate, trimethylene diisocyanate, tetramethylene diisocyanate, etc; other alkylene diisocyanates, such as propylene-1,2-diisocyanate, butylene-1,2-diisocyanate, butylene-1,3-diisocyanate, butylene-2,3-diisocyanate, etc.; alkylidene diisocyanates, such as ethylidene diisocyanate, butylidene diisocyanate, etc.; cycloalkylene diisocyanates, such as cyclopentylene-1,3-diisocyanate, cyclohexylene-1,4-diisocyanate, 4,4'-diisocyanato bis(cyclohexyl)methane, etc.; p-phenylene-2,2'-bis(ethyl isocyanate); p-phenylene-4,4'-bis (butyl isocyanate); m-phenylene-2,2'-bis(ethyl isocyanate); 1,4-naphthalene-2,2'-bis(ethyl isocyanate); 4,4'-diphenylene-2,2'-bis(ethyl isocyanate); 4,4'-diphenylene ether-2,2'-bis (ethyl isocyanate); tris(2,2',2''-ethyl isocyanate benzene); 5-chloro phenylene-1,3-bis(propyl-3-isocyanate); 5-methoxy phenylene-1,3-bis(propyl-3-isocyanate); 5-cyano phenylene-1,3-bis(propyl-3-isocyanate); and 5-methyl phenylene-1,3-bis(propyl-3-isocyanate).

Examples of aromatic polyisocyanates which can be used include: tolyene diisocyanate; m-phenylene diisocyanate; p-phenylene diisocyanate; 1-methyl-2,4-phenylene diisocyanate; naphthylene-1,4-diisocyanate; diphenylene-4,4'-diisocyanate; xylylene-1,4-diisocyanate; xylylene-1,3-diisocyanate; and 4,4'-diphenylenemethane diisocyanate.

Any material containing a plurality of hydroxyl groups can be used for reacting with the polyiosycanate constituent to form the set or cured composition of the present invention. Examples of classes of such materials include hydroxyl polyesters, polyhydric polyalkylene ethers, polyhydric polyalkylene thioethers, and hydroxyl-terminated diene polymers.

Hydroxyl polyesters comprise the reaction mixture of a polycarboxylic acid and a polyhydric alcohol. Examples of the aforementioned acid are succinic, adipic, azelaic, phthalic, terephthalic, maleic, and itaconic. Examples of polyhydric alcohols are ethylene glycol, propylene glycol, butylene glycol, 1,6-hexane diol and pentaerythritol.

Polyhydric polyalkylene ethers are the condensation product of an alkylene oxide with a small amount of a compound containing active hydrogen-containing groups such as, for example, water, ethylene glycol, propylene glycol, butylene glycol, trimethylolpropane, and glycerine.

As to the polyhydric polyalkylene thioethers, they can be prepared by reacting alkylene oxides, such as those mentioned above, with a polyhydric thioether such as, for example, thiodiglycol, 3,3'-dihydroxypropyl sulfide, 4,4'-dihydroxylbutyl sulfide, and 1,4-(beta hydroxyethyl) phenylene dithioether.

Hydroxyl-terminated diene polymers that can be used are ones which have the hydroxyl groups present in predominately primary, terminal positions on the main hydrocarbon chain and allylic in configuration. Dienes which are employed to make the aforementioned polymers are unsubstituted, 2-substituted, or 2,3-disubstituted 1,3-dienes of up to about 12 carbon atoms. Preferably, the diene has up to 6 carbon atoms and the substituents in the 2-, and/or 3-position may be hydrogen, lower alkyl of about 1 to about 4 carbon atoms, aryl (substituted or unsubstituted), halogen, nitro and nitrile. Examples of dienes which can be used are 1,3-butadiene, isoprene, chloroprene, 2-cyano-1,3-butadiene, and 2,3-dimethyl-1,3-butadiene. Excellent results have been obtained utilizing liquid resins which are hydroxyl-terminated homopolymers and copolymers of butadiene, examples of such copolymers being styrene/butadiene and acrylonitrile/butadiene. Such materials are sold commercially under the trademark "Poly bd", specific product designations being R-15M, R-45M, R-45HT, CS-15 and CN-15.

In preparing the cured polyurethane composition from the polyisocyanate and polyol, all of the ingredients comprising the composition are admixed, and the hydroxyl groups react to form the cured polyurethane. In this type of reaction, often referred to as a "one-shot" reaction, the polyisocyanate can be used in amounts ranging from about 95 to about 200 wt. % of the calculated stoichiometric amount of the polyol used. Suitable well known catalysts can be used in the reaction.

The cured polyurethane can also be prepared from a prepolymer which is the reaction product of a polyisocyanate and a polyhydroxy compound such as, for example, a hydroxyl-terminated polyester resin, a hydroxyl-terminated polyether and a hydroxyl-terminated polydiene resin. In preparing such prepolymers, a molar excess of the polyisocyanate is reacted with the polyhydroxy compound, for example, one having a molecular weight of about 200 to about 10,000, in order to produce a reaction product or prepolymer that contains at least two unreacted isocyanate groups per molecule. Thus, the prepolymer contains a multiplicity of -NCO groups which are capable of reacting to set the composition.

The aforementioned prepolymers and methods for preparing them are well known. Speaking generally, the aforementioned hydroxyl-terminated polyester resin reactant that can be used in preparing the prepolymer is itself the reaction product or a polybasic acid (usually a dibasic acid) and a polyhydroxy compound such as, for example, ethylene glycol, tetramethylene glycol and hexamethylene glycol. Examples of hydroxyl-terminated polyethers, also commonly referred to as polyether glycols, that can be reacted with the polyisocyanate to form the prepolymer are polyethylene ether glycol, polypropylene ether glycol, polytetramethylene ether glycol, and poly (oxypropylene) triol or other oxyalkylene adducts of polyols, such as ethylene and dipropylene glycol, and other polyols such as glycerine, trimethanol propane, pentaerythritol, and sucrose. The prepolymer can also be prepared from hydroxyl-terminated polydiene resins described above.

One of the important economic advantages of the present invention is that of the many polyisocyanates that are known, sealants having excellent properties can be obtained by using those that are readily available at relatively low cost. These polyisocyanates include toluene diisocyanate (hereafter referred to as "TDI"), including for example, a commercially available mixture containing about 80% of 2,4-TDI and 20% of 2,6-TDI, and methylene bis-(4-phenyl isocyanate) (hereafter referred to as "MDI"), including a commercially available material often referred to as "crude MDI". Such polyaryl polyisocyanates are sold commercially by Upjohn Company under the trademark PAPI, by Mobay Chemical Company under the trademark MONDUR MR, and by Upjohn under the trademark Isonate.

Similarly, relatively low cost, commercially available polyols and prepolymers can be used as the polyol reactant. Such materials are available under the trademarks Niax, Isofoam and Pluracol.

POLYETHER POLYMER

Polyether polymers useful in preparing the composition of the present invention are those in which the major portion of the polymeric chain is comprised of polyalkylene ether group and in which the polymeric chain is terminated at each end with reactive groups such as hydroxyl, mercaptan or epoxy groups. Such polymers are liquid and can be cured through the reactive terminal groups by the use of conventional curing agents or catalysts, for example, oxidizing agents and amines, into solid materials. Curing of such polymers yields higher molecular weight polymers comprising mainly a polyether backbone linked together by the reaction of their terminal groups. The performance of the cured polymer corresponds mainly to its polyether content which comprises about 90 wt. % or more of its structure.

Examples of the aforementioned liquid polymers are polyalkylene ethers having terminal hydroxyl groups at each end of the polymer, for example, those of the formula H$-$(OR)$_n$-OH wherein R is $C_2H_4$, $C_3H_6$ or $C_4H_8$ and wherein $n$ is a number such that the molecular weight of the polymer is within the range of about 400 to about 4,000. An example of such a polyalkylene ether is sold under the trademark PPG 2,000; it is a polypropylene ether having a molecular weight of about 2,000.

Diepoxy terminated polyethers can be derived from the polyalkylene ethers mentioned immediately above. An example of a diepoxy terminated polyether which is curable with an amine is sold under the trademark Dimeric.

Plasticized polymeric compositions within the scope of the present invention can be also prepared from mercaptan terminated polyethers, for example, those of the formula

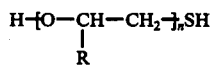

wherein R is hydrogen or an alkyl group containing 1 to about 6 carbon atoms or phenyl, and wherein $n$ is a number such that the molecular weight of the polymer is within the range of about 200 to about 6,000. Such polymers can be prepared through ring opening of epoxy compounds by anionic polymerization catalyzed by HS$^-$ ion. Preferred liquid polymers are those having a molecular weight of about 2,000 to about 4,000 and are commercially available. In the practice of the present invention such polymers can be cured according to conventional techniques, for example, by curing with an oxidizing agent such as lead peroxide, manganese dioxide or calcium dioxide.

PLASTICIZING MATERIALS

The plasticizing material for use in the composition of this invention is characterized by having low volatility and low water absorption properties. It will be seen from the discussion below that a variety of different types of plasticizing materials and mixtures of such materials can be used. Guidelines that can be used in selecting the plasticizing material are related to the following properties thereof: the water absorption properties of the plasticizing material, as determine by ASTM D570, are less than about 0.1 wt. %; and the volatility properties of the plasticizing material are such that the product of (i) the vapor pressure of the plasticizing material in mm of Hg at 480° F and (ii) the concentration of the plasticizing material in the composition in wt. % is not greater than about 1,200.

There follows a detail description of exemplary plasticizing materials that can be used. It should be noted that the materials generally fall within two basic classes of materials, namely, (A) relatively low molecular weight materials that are known in the plastic industry as plasticizers, for example phthalates, chlorinated hydrocarbons, diesters and aromatic oils, and (B) relatively high molecular weight resinous and polymeric materials, for example, coal tars, asphalts, polybutenes, and hydrocarbon and hydrocarbon modified resins derived from low molecular weight compounds and monomers of materials of coal, pinetree or petroleum origin. It should be understood that the plasticizing described in detail below are exemplary and that other plasticizing materials which have the aforementioned low water absorption and low volatility properties mentioned above can be used also.

Selected coal tars can be used to prepare the composition. The coal tar should have a distilled point of no lower than about 500° F, and preferably a distillation point of 600° F or higher. The coal tar is preferably a pourable liquid at room temperature, but it may also be a solid which upon heating to a temperature of no greater than about 150° F–250° F becomes a pourable liquid.

A special class of asphalts can be used as the plasticizing ingredient. The asphalt that is suitable is roofing grade asphalt, a commercially available material which has substantially no volatiles at temperatures up to about 500° F. Roofing grade asphalt is essentially a solid that slightly softens at a temperature of 80°–100° F, and it becomes pourable at temperatures of 150° F or higher. By way of example, commercially available roofing grade asphalt that has a softness of 20/40 to 60/70 rod penetrometer can be used.

Selected coal tars, asphalts and other by-product tars for use in the sealants of the present invention must have a very low volatility, as evidenced by substantially no weight loss (about 0.5 wt. % or less) when left exposed in a hot-air-circulating oven for 24 hours at a temperature of about 200° F. Developmental work has shown that the use in sealants of materials having such volatility properties results in sealants which have satisfactory volatility properties, that is, they do not volatilize into the insulated glass unit and do not deposit chemical fog on the inner surfaces of the glass panes. To pass the SIGMA test, there must be no chemical fogging after the unit is subjected for 14 days to a temperature of 150° F. The conditions of the test include a U.V. lamp as a heat source and a cold metal condenser which is held against a section of the glass to condense any organic materials that volatilize.

Another class of plasticizing materials that can be used are high boiling phthalates, that is, those having a boiling point of 450° F or higher at 10 mm Hg. Specific examples of such phthalates are as follows: benzyl phthalate, a clear oily liquid having a molecular weight of about 445, a boiling point at 10 mm Hg of about 470° F, a vapor pressure at 482° F of 15 mm Hg and a flash point (C.O.C.) of about 440° F; alkyl benzyl phthalate, a clear oily liquid having a molecular weight of about 368, a boiling point at 10 mm Hg of about 485° F, a vapor pressure 480° F of 9.7 mm Hg and a flash point (C.O.C.) of 445° F; and dialkyl phthalates, a clear oily liquid having a molecular weight of about 414, a boiling point at 10 mm Hg of about 485° F, a vapor pressure of 482° F of 9 mm Hg and a flash point (C.O.C.) of about 440° F. A commercially available form of said dialkyl phthalate is a mixture of dialkyl phthalates wherein the alkyl groups are mixed $C_7$, $C_9$, and $C_{11}$ predominately linear groups, which mixture is sold under the trademark Santicizer 711. Commercially available forms of said benzyl phthalate and said alkyl benzyl phthalate are sold respectively under the trademarks Santicizer 278 and Santicizer 261. Examples of other high boiling phthalates are those sold under the trademark Jayflex and include dihexyl phthalate, diisononyl phthalate, diisodecyl phthalate and ditridecyl phthalate, the last two mentioned being particularly preferred. It should be understood that other high boiling phthalates can be used, provided they are high boiling as described above and have low volatility.

Another class of materials that can be used are chlorinated paraffins with a chlorine content of at least about 40–70 wt. % and preferably as high as is available. Such materials have good plasticizing capacity, good tack for adhesion and impart good elongation properties to the composition. The chlorine content of the paraffins appears to aid compatibility and improve UV resistance for many urethanes. An example of a suitable chlorinated paraffin is sold under trademark Escoflex CLP-52. This material is a stabilized chlorinated paraffinic hydrocarbon produced by the chlorination of straight chain high boiling hydrocarbons; it is a nearly water-white, mobile liquid which has a low volatility, a chlorine content of about 50–52 wt. %, a specific gravity at 25° C of about 1.2–1.25 and a viscosity at 25° C of about 3 to 18 poises. Another example of a suitable chlorinated paraffin is sold under the trademark Escoflex CLP-59. This material is also a stabilized chlorinated paraffinic hydrocarbon produced by the chlorination of normal paraffinic hydrocarbons; it is a nearly water-white mobile liquid which has a low volatility, a chlorine content of about 57–59 wt. %, a specific gravity at 25° C of 1.35–1.36 and a viscosity at 25° C of about 15–20 poises. Other commercially available chlorinated paraffins that can be used are sold under the trademark Chlorowax 50 and Chlorowax 70.

Polybutene is an additional class of materials that can be used as a plasticizer. This polymer is generally made by polymerizing an isobutylene-rich butene stream in the presence of a metal halide catalyst. The polybutene can be a mixture of different polybutenes of varying molecular weights and predominately of the structure

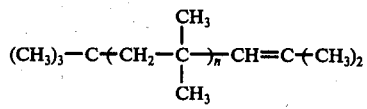

wherein n is a number such that the average molecular weight of the polybutadienes is within the range of about 850 to about 2,500. The material is a liquid polymer which should be relatively non-volatile as evidenced by a weight loss of about 1% or lower when subjected to ASTM D-972 for 10 hours at 210° F. Also, typical polybutenes for use in this invention will evidence substantially no volatility loss when heated to a temperature of about 500° F, and preferably substantially no such loss when heated to a temperature of about 600° F. Commercially available polybutenes that can be used in the practice of the present invention are sold under the trademark Indopol, specific product designations being H-100, H-300, H-1500 and H-1900.

Aromatic oils having low volatility are another class of materials that can be used as the plasticizer. Such oils are generally comprised of a mixture of materials with a major weight percent of the oils comprising aromatics. Such oils are often used as processing oils for rubber goods. Set forth below are exemplary characteristics of suitable aromatic oils.

| PHYSICAL PROPERTIES | Oil A | Oil B |
|---|---|---|
| Viscosity SUS 100° F | 3000 | 7000 |
| Viscosity SUS 210° F | 85.7 | 122.6 |
| API gravity, 60° F | 12.8 | 10.3 |
| Specific gravity, 60° F | .9806 | .9979 |
| Viscosity-gravity constant | .932 | 946 |
| Weight, molecular | 375 | 395 |
| Pour point, ° F | 55 | 55 |
| Volatility: | | |
| % wt. loss, 22 hr. at 225° F | 1.3 | 0.26 |
| Flash point, COC, ° F | 435 | 445 |
| CHEMICAL PROPERTIES | | |
| Molecular type analysis | | |
| Clay-gel, wt. % | | |
| Asphaltenes | 0.1 | 0.1 |
| Polar compounds | 7.9 | 8.3 |
| Aromatics | 68.8 | 72.2 |
| Total aromatics | 76.7 | 80.5 |
| Saturates | 23.2 | 19.4 |
| Carbon type analysis, % | | |
| Ca | 37 | 41 |
| Cn | 28 | 24 |
| Cp | 35 | 35 |
| Aniline point, ° F | 116 | 107 |

The above aromatic oils are exemplary. Other aromatic oils, for example, those comprising about 70 to about 85 wt. % aromatics can be used. Examples of aromatic oils that are commercially available are those sold under the trademarks Sundex 770, Sundex 8125 and Paraflux 10.

Additional classes of materials that can be used as plasticizing ingredients are hydrocarbon and modified hydrocarbon resins derived largely from low molecular weight compounds and monomers of coal, pinetree or petroleum origin.

By way of example, there can be used highly aromatic, nonsaponifiable, nonpolar and nonreactive low molecular weight (for example, about 750 to about 1100 — number average) stable thermoplastic hydrocarbon resins derived from petroleum monomers. Such resins are sold by Neville Chemical Company under the trademark Nevchem and No. designations 100, 110, 120, 130, and 140. They have ring and ball softening points within the range of about 100 ° to 140° C and an iodine number (ASTM D-1959) within the range of about 55 to about 65. Other exemplary aromatic resins produced from petroleum derived monomers are sold by Hercules Incorporated under the trademarks Picco (6000 Series) and Piccovar. Such resins include liquid and solid materials having a ring and ball softening point within the range of about 70° to about 140° C. Other examples of aromatic petroleum-based thermoplastic hydrocarbon resins, which are nonreactive and nonsaponifiable, are sold under the trademark Nebony by Neville Chemical Company. They have ring and ball softening points within the range of about 100 to 110, flash points (C.O.C., ° F, ASTM D-92) of about 560 to 565 and molecular weights (number average by Osmometry) within the range of about 475 to 550 and an iodine number (Wijs, ASTM D-1959) in the neighborhood of about 65. Another example of an aromatic type resin that can be used is based largely on vinyltolune and is sold by Hercules Incorporated under the trademark Piccotex, for example Piccotex 120 which has a ring and ball softening point of about 120° C and a flash point (C.O.C.) of about 545° F.

An example of an aliphatic petroleum-based resin is a cyclopentadiene derived polymer such as that sold by Neville Chemical Company under the trademark Neville LX-1082. This resin, which has good stability has a ring and ball softening point of about 100° C, a flash point (C.O.C., ° F, ASTM D-92) of about 425, an iodine number (Wijs, ASTM D-1959) of about 140 and a molecular weight (number average by Osmometry) of about 685. Another example of a class of aliphatic resins comprise mainly polydicyclopentadiene sold under the trademark Piccodiene by Hercules Incorporated. They have ring and ball softening points within the range of about 100 ° to about 140° C and a flash point (C.O.C.) within the range of about 435 ° to about 490° F. Other aliphatic resins produced from petroleum-derived monomers are sold under the trademarks Piccopale and Piccotac by Hercules Incorporated. Still another example of an aliphatic resin is one made from mixed low molecular weight monomers and sold by Hercules Incorporated under the trademark Piccovar. Such resins having ring and ball softening points within the range of about 165° to about 180° C and a flash point (C.O.C.) within the range of about 570° to about 585° F.

Examples of chemically inert hydrocarbon resins which are coal tar-based are coumarone-indene resins having a low iodine number which ensures good oxidation resistance. An example of such a resin is one sold by Neville Chemical Company under the trademark Paradene No. 2 and having a ring and ball softening point of about 100° F, an iodine number (ASTM D-1959) of about 65, a flash point (C.O.C., ° F, ASTM D-92) of about 525 and a molecular weight (number average by Osmometry) of about 700. Other examples of coal tar-based hydrocarbon resins are polyindene resins manufactured from coal-derived unsaturated compounds. Such resins are sold by Hercules Incorporated under the trademark Piccoumaron and have a ring and ball softening point within the range of about 100° to about 120° C and a flash point (C.O.C.) within the range of about 510° to about 540° F. Piccoumaron 120 resin is a specific example of such coal-derived resins.

Resin produced from monomers derived from both coal and petroleum are sold by Hercules Incorporated under the trademark Piccomer. For example, Piccomer 150 resin has a ring and ball softening point of about 153° C and a flash point (C.O.C.) of about 530° F.

An additional class of plasticizing materials that can be used are aliphatic and aromatic diesters of the general formula

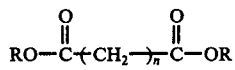

wherein "R" is an aliphatic or aromatic group having six or more carbon atoms and "n" is about 6 to about 18. Examples of such diesters include: di-2-ethylhexyl sebacate; di-n-butyl sebacate; di-n-hexyl sebacate; di-n-butyl hexoate; di-n-hexylazelate; di-n-hexyladipate; di-(2-ethyl hexyl) adipate; dibenzyl sebacate; dibenzyl adipate; dibenzyl hexoate; dibenzyl azelate.

It is noted that various of the commercially available plasticizing materials may contain small quantities of relatively low molecular weight materials having a relatively high volatility. (For example, this is particularly true of hydrocarbon and modified hydrocarbon resins derived from coal, pine oil and petroleum sources.) Such higher volatility fractions should be removed prior to use of the materials.

In utilizing the present invention on an industrial scale, it will be convenient to sell the ingredients used to prepare a composition from a prepolymer in a 2-package arrangement, one package including the prepolymer and plasticizing material, and the other package including the catalyst or other curing agent. For the purposes of package stability, the plasticizing material should be free of materials which are reactive with the free NCO groups of the prepolymer. If plasticizing materials such as coal tars, asphalts, etc., contain materials such as, for example, water or amines, it is recommended that they be treated with lime or an isocyanate to dry the material or to react with the aforementioned reactive materials to thereby provide a stable non-reactive mixture. This will help insure package stability.

The basic constituents used in preparing the cured composition of the present invention have been described above. Guidelines on the selective use of the plasticizing material and polymeric constituents follow. It is the selective combination of these basic constituents which result in a composition that has the combination of properties that are required of a satisfactory sealant for insulated glass.

The properties of the various cured polymers comprising the composition tend to vary from one to another. For example, some polyurethanes are more hydrophobic than others. (The term "hydrophobic" is used herein to refer to the ability of a material to resist the flow of water vapor therethrough. Accordingly, the more hydrophobic the material, the lower its MVT rating.) Work has shown that cured polyurethanes based on hydroxyl-terminated polydiene resins, for example, butadiene resins thereof, have excellent hydrophobic properties, whereas polymers based on water sensitive polyethers, for example, polypropylene ethers, have relatively poor hydrophobic properties. Although it is possible to perhaps prepare compositions which have the properties required of insulated glass sealants from hydrophobic polyurethanes based on the aforementioned diene resins, without the use of plasticizing material, such compositions would be prohibitively expensive. In accordance with the present invention, it has been found that cured compositions comprising as little as 20 wt. % cured polyurethanes prepared from such diene resins have improved hydrophobic properties over those containing no plasticizing material. Accordingly, the use of selected plasticizing materials according to the present invention improves the hydrophobic properties of very hydrophobic cured polymers and reduces the cost of the composition. In addition, other properties of the cured composition can be improved through the selective use of plasticizing materials.

As to those cured polymers which have relatively poor hydrophobic properties, the selective use of plasticizing materials according to the present invention results in cured compositions which have MVT ratings of 1 g/day or less. In addition, other properties of the cured composition can be improved and the cost lessened through the selective use of plasticizing materials.

As to the capability of the plasticizing materials to impart improved hydrophobic properties to the cured composition, work has shown that the following materials listed in the order of relative performance, are very effective: asphalt, greatest improvement; coal tars, coal tar derivatives, aromatic and aliphatic hydrocarbon resins, and coumarone-indene resins, almost as good; and followed by highboiling process oils such as the commercial Sundex oils and the polybutenes, polyisobutylenes and polybutadiene drying oils. It is believed that the hydrocarbon backbone of these materials and the absence of oxygen and ether structures are responsible for the hydrophobic and water resistant properties of these materials. Work has further shown that cured compositions comprised of the most hydrophobic polymers and the most hydrophobic plasticizing materials have the lowest MVT rating.

Various factors other than the effect of hydrophobic improvement by the plasticizing material may have to be taken into account in selecting this constituent. One such factor is its compatibility with a particular cured polymer. An incompatible plasticizing material will tend to bleed out of or exude from the cured composition promptly or upon ageing, thereby adversely affecting the properties thereof. A particular plasticizing material may be compatible with some cured polymers, but not with others, or it may be compatible with a particular cured polymer, but only over a limited weight range. As will be seen below, plasticizing materials which are not compatible with a particular cured polymer may be made compatible therewith by the combined use of one or more additional plasticizing materials. Another related factor that should be taken into account is the selection of a material which is miscible with the liquid reactants used to prepare the cured polymer. (In general, the plasticizing material portion and the polymer-reactant portion of the mixture will each be in the liquid state when the ingredients are mixed. Heat may be used to melt or render flowable solid materials.) If the ingredients are not miscible, separate liquid phases are formed with the result that the properties of the cured composition are affected adversely. A plasticizing material may be miscible with some reactants which are the source of the cured polymer, but not with other reactants, or it may be miscible therewith, but only over a limited weight range. As will be seen below, plasticizing materials which are not miscible with certain reactants may be combined with one or more other materials to form a mixture which is miscible.

Other factors to take into account in selecting the plasticizing material include the effect on elongation and toughness of the cured composition, the capability of not interfering with the curing of the polymer and the effect on viscosity of the liquid ingredients from the standpoint of ease of mixing.

As illustrative of the above, it is noted that asphalt, an excellent material for improving the hydrophobic properties to the cured composition, is highly compatible with various polyurethanes based on hydroxyl-terminated polybutadienes, but is only partially compatible with some cured mercaptan-terminated polyethers, and is incompatible with polyurethanes made from popularly used reactants. The use of liquid chlorinated paraffins in combination with the asphalt provides a mix which is compatible with the aforementioned polymers. Also, upon heating a mixture of liquid chlorinated paraffins and normally solid asphalt, a miscible liquid, which remains liquid at room temperature, is obtained. Aromatic oils liquify asphalt at lower temperatures, improve elongation of coal tar/polyurethane compositions, and in general improve flexibility of the cured polymers. Other plasticizing mixes are illustrated in the examples below. Examples below show compositions wherein upon mixing the reactants which form the cured polymer with the liquid plasticizing component, there is obtained a homogeneous composition which in its cured state contains plasticizing material that is compatible with the cured polymer and does not separate or exude therefrom.

The composition of the invention can also contain optional miscellaneous ingredients, including, for example, filler, curing catalyst, a thixotropic agent, and a glass adhesion promoter. The fillers used should be hydrophobic; they can be used to impart improved hydrophobic properties to the composition. Examples of fillers that can be used are talc, titanium dioxide, carbon black, and finely ground sulfur. Any of the commonly used curing catalysts can be used in curing the polyurethane or polyether polymers. Examples of thixotropic agents that can be used are very fine asbestos fibers, colloidal silicas, and clays, for example, bentonite. Examples of glass adhesion promoters that can be used are silane and organic silanes having from 2 to 3 alkoxy or hydroxy groups and from 1 to 2 organic groups terminated with functional groups such as amino, epoxy or isocyanate groups. Such silanes are also effective in improving the adhesive bond between the cured composition and a metallic surface. In general, the adhesion promoter should comprise about 0.5 to about 2.5 wt. % of the composition.

The composition should comprise about 20 to about 50 wt. %, preferably about 30 to about 45 wt. % of the polymeric constituent and about 20 to about 60 wt. %, preferably about 20 to about 40 wt. % of plasticizing material. Up to about 40 wt. %, and preferably about 20 to about 35 wt. % of the composition, can be comprised of filler. If the thixotropic agent is used, it can comprise about 2 to about 6 wt. % of the composition, preferably about 3 to about 5 wt. %

Particularly preferred compositions comprise about 30 to about 40 wt. % of hydroxyl-terminated polybutadiene resin/TDI or MDI polyurethane and about 20 to about 35 wt. % plasticizing material, with the plasticizing portion comprising: (A) about 3 to about 20 wt. % coal tar or asphalt or polybutenes or a mixture thereof, and (B) about 80 to about 97 wt. % of phthalates or aromatic resins or aromatic oil or a mixture thereof.

When utilizing a polymer made from a water-sensitive polyether, for example, polypropylene glycol, it is preferred that the composition comprise about 30 to about 40 wt. % of the polymer and about 35 to about 55 wt. % of plasticizing material, with the plasticizing portion comprising: (A) about 25 to about 75 wt. % asphalt or coal tar or a mixture thereof; and (B) about 25 to about 75 wt. % of chlorinated paraffins or high-boiling phthalates (Santicizer) or a mixture of one or more of the same, (C) about 5 to about 30 wt. % of filler; (D) about 2 to about 6 wt. % thixotropic agent; and (E) about 0.5 to about 2.5 wt % of a glass adhesion promoter.

Other cured compositions from which insulated glass sealants can be prepared comprise about 25 to about 50 wt. % of a polyurethane prepared from a hydroxyl-terminated diene polymer, preferably a hydroxyl-terminated polybutadiene, and about 20 to about 40 wt. % of one or more of the following liquid plasticizing materials: a phthlate having a boiling point of no less than 450° F; a chlorinated paraffin having a chlorine content of at least about 50–70 wt. %; a polybutene having a molecular weight within the range of about 850 to about 2,500; high melting aromatic or aliphatic resins; and a heat curable polybutadiene polymer. Also, one or more of the aforementioned liquid plasticizing materials can comprise a portion of the mixture comprising one or more of the following, the "wt. %" therof being based on the total weight of the plasticizing portion of the composition: about 30 to about 60 wt. % of coal tar; about 30 to about 60 wt. % of roofing asphalt; about 20 to about 40 wt. % of aromatic oil; and about 40 to about 60 wt. % of an aromatic resin.

Another composition which can be used as a sealant for insulated glass comprises about 20 to about 50 wt. % of a cured polyurethane or a cured polyether made from a water-sensitive glycol, including, for example, polyethylene or polypropylene glycol, and about 40 to about 55 wt. % of a mixture of plasticizing material, said mixture comprising: about 50 to about 90 wt. % of coal tar or roofing asphalt or a mixture therof; and about 10 to about 50 wt. % of one or more of the following liquid plasticizing materials: a chlorinated paraffin having a chlorine content of at least about 50–70 wt. %; a phthalate having a boiling point of no less than about 450° F; a polybutene having a molecular weight within the range of about 850 to about 2,500; and an aromatic oil.

Sealant compositions having particularly good overall properties have been prepared from compositions comprising:

A. about 30 to about 45 wt. % of polyurethane prepared by reacting a prepolymer of hydroxyl terminated polybutadiene and TDI with butanediol; and
B. about 25 to about 35 wt. % of a plasticizing material comprising:
   i. high boiling phthalate; or
   ii. a mixture of about 5 to about 95 wt. % of said phthalate and 5 to about 95 wt. % of asphalt; or
   iii. a mixture of about 5 to about 95 wt. % of said phthalate and about 5 to about 95 wt. % of polybutene;
C. about 25 to about 35 wt. % filler, preferably talc or calcium carbonate; and
D. about 0.5 to about 2.5 wt. % of glass adhesion promoter; and
E. about 3 to about 5 wt. % of a thixotropic agent.

The preferred high boiling phthalates are ditridecyl phthalate or diisodecyl phthalate. In the above formulation, the polyurethane can be prepared from other hydroxyl-terminated dienes and polyisocyanates. When the polyurethane is prepared from a prepolymer, other short chain polyols (molecular weight of no greater than about 200) can be used.

EXAMPLES

Examples below are illustrative of the invention.

The first two examples illustrate a plasticized cured polyurethane prepared from MDI and a hydroxyl-terminated polydiene and a mixture of plasticizers comprising roofing asphalt (as described above) and a chlorinated paraffin to render the asphalt miscible and compatible. The polydiene used was Poly bd R-45HT, a hydroxyl-terminated polybutadiene having a hydroxyl content of about 0.8 meq/g. The following 2-part mixtures were prepared for each of the compositions.

|  | Ex. No. 1 | Ex. No. 2 |
|---|---|---|
| Part A |  |  |
| roofing asphalt | 14 g | 11 g |
| chlorinated paraffin (CLP-59) | 22 g | 7 g |
| hydroxyl-terminated butadiene | 30 g | 15 g |
| low mol. wt. diol chain extender (Wyandotte P245) | 12 g | 6 g |
| carbon black dispersion | 15 g | 8 g |
| dibutyltin dilaurate | 2 drops | 1 drop |
| stannous octoate | " | " |
| Part B |  |  |
| MDI (Isonate 143L) | 11.5 g | 5.75 g |
| talc | 3 g | 1.5 g |
| bentone | 1 g | 0.5 g |

The ingredients comprising Part A of each of the examples were heated with mixing to a temperature of about 200° F until the asphalt had melted and the mix became homogeneous. Part A was allowed to cool to room temperature at which it remained liquid. Part B was then added to Part A and the compositions were cured at room temperature.

The MVT of the cured composition of Ex. No. 1 was 0.52 g/day and that of No. 2 was 0.35 g/day. The elongation of each of the cured compositions was in excess of 100% and the cured compositions had satisfactorily low volatility properties. The addition of a glass adhesion promoter, for example, a silane to the above composition, results in cured compositions which bond excellently to glass.

The next example is illustrative of a commercially available composition and is presented for comparative purposes.

EXAMPLE A

A cured polyurethane composition was prepared from ingredients set forth in Example No. 2 above except that there were substituted for the roofing asphalt and chlorinated paraffin the following: 20 g of a 70% asphalt cutback and 5 g of an aromatic oil (Sundex 790). The asphalt comprised about 50 wt. % of the composition and the polyurethane 32.5 wt. % of the composition. Although the MVT (0.2 g/day) of the cured composition was satisfactory, the volatility properties thereof were not due to the solvent in the asphalt cutback.

EXAMPLE NOS. 3 AND 4

Two compositions were prepared from the same polyurethane reactants used in Example Nos. 1 and 2 and in amounts such that the cured urethane comprised 30 wt % of the composition. One of the compositions contained about 47 wt. % chlorinated paraffin (CLP-59), and the other about 41 wt. % of plasticizer with about 76 wt. % of the plasticizer portion comprising chlorinated paraffins (CLP-59) and the remainder roofing asphalt. The MVT ratings of the compositions were respectively 0.31 and 0.37 g/day (each measured over a 27-day period). The elongations of the cured compositions were in excess of 100%, and the volatility properties were satisfactory. The addition of glass adhesion promoters to the compositions results in the cured forms thereof having excellent glass adhesion.

| Ingredients | Example Nos. 5-9 | | | | |
|---|---|---|---|---|---|
| | Ex. No. 5 | Ex. No. 6 | Ex. No. 7 | Ex. No. 8 | Ex. No. 9 |
| Plasticizing Mats. | | | | | |
| high boiling coal tar | 10 | 40 | — | 30 | 30 |
| solid roofing asphalt | 20 | — | 30 | — | — |
| chlorinated paraffins (CLP-59) | 10 | 12 | — | 10 | 10 |
| aromatic oil (Sundex 8125) | — | — | 11 | — | — |
| Polyurethane Reactants | | | | | |
| hydroxyl-terminated polybutadiene (R-45HT) | 15 | 15 | 15 | — | 12 |
| low. mol. wt. diol chain extender (Wyandotte P245) | 6 | 6 | 6 | 4 | 4 |
| MDI (Isonate 143L) | 6 | 7 | 5½ | 5½ | .5½ |
| polyether polyol (Niax LC-34) | — | — | — | 15 | 3 |
| Properties | | | | | |
| MVT g/day | 0.27 | 0.32 | 0.21 | 0.46 | 0.44 |
| Elongation | ← in excess of 100% → | | | | |
| Volatility | ← satisfactory → | | | | |

The above examples show the excellent hydrophobic properties imparted to the cured composition by roofing asphalt and the good results obtained utilizing high boiling coal tar. The examples also illustrate the use of selected plasticizers to impart excellent hydrophobic properties to urethanes made from normally water sensitive polyols.

EXAMPLE NO. 10

Work has shown that roofing asphalt is incompatible with polyether/NCO prepolymers of the type representative of those made from polyalkylene ethers based on propylene glycol and of molecular weight about 2000 (PPG 2025). However, other plasticizing materials can be used in combination with roofing asphalt to achieve compatibility. For example, a 2 wt. % NCO polyether based on PPG 2025 in combination with equal amounts of chlorinated paraffins (CLP-59) and asphalt and cured as a 1-part composition using moisture from the air, with a polyurethane content of 30 wt. %, gave an MVT of 0.4 g/day with no incompatibility problems.

The next example illustrates the use of a cured composition prepared from a mercaptan-terminated polyether.

EXAMPLE NO. 11

The composition comprised about 35 wt. % of a mercaptan-terminated polyether and about 50 wt. % of a plasticizing mix, 25% of which comprised chlorinated paraffins (CLP-59) and about 25 wt. % of roofing asphalt, with the remainder of the composition comprising mainly filler. The composition was cured utilizing manganese dioxide. The MVT of the cured composition was 0.5 g/day, its elongation was in excess of 100%, and it had satisfactory volatility properties. The addition of a glass adhesion improver such as, for example a silane to the aforementioned composition results in a cured composition having excellent adhesion to glass.

The next for examples are illustrative of compositions having an excellent combination of properties.

| Ingredients | Amts. of Ingredients, in grams | | | |
|---|---|---|---|---|
| | Ex. No. 12 | Ex. No. 13 | Ex. No. 14 | Ex. No. 15 |
| NCO & OH reactants | | | | |
| hydroxyl terminated polybutadiene (R-45HT) | 650 | 460 | 460 | 650 |
| polyether polyol (LC-34) | 100 | 90 | 90 | 100 |
| low molecular weight diol (P245) | 180 | 120 | 120 | 180 |
| MDI (Isonate 143) | 270 | 185 | 185 | 270 |
| Plasticizing Mats. | | | | |
| chlorinated hydrocarbon (CLP-59) | 900 | 300 | 300 | 900 |
| polybutene (H-100) | 150 | 300 | 300 | 300 |
| aromatic oil (Sundex 8125) | 150 | — | — | — |
| coal tar (Neo Rez LV2) | — | 600 | — | — |
| solid roofing asphalt | — | — | 600 | — |
| Miscellaneous Ingredients | | | | |
| filler, mainly talc | 375 | 325 | 325 | 375 |
| catalyst, 40 wt. % dibutyltin dilaurate and 60 wt. % stannous octoate | 5 | 5 | 5 | 5 |
| thixotropic agent (asbestos) | 200 | 120 | 60 | 200 |
| silane adhesion improver | 30 | 30 | 30 | 30 |
| Properties of Cured Comp. | | | | |
| MVT, g/day | 0.5 | 0.3 | 0.2 | 0.4 |
| elongation | 300% | 325% | 575% | 300% |

The glass adhesion properties of each of the above compositions were evaluated. In each case, there was cohesive failure of the composition and no failure of the adhesive bond between the glass and the composition. Upon subjecting the cured compositions to volatility testing as described above, there was no chemical fogging or condensate after 14 days of testing at 180° F and no chemical fogging or condensate after 3 days of exposure to a sun lamp.

The next 2 examples are illustrative of preferred compositions within the scope of the present invention.

| Ingredients | Amts. of Ingredients, in grams: | |
|---|---|---|
| | Ex. No. 16 | Ex. No. 17 |
| NCO & OH reactants | | |
| hydroxyl-terminated polybutadiene (R-45HT) prepolymer with 6% NCO | 100 | 150 |
| polyether polyol (LC-34) prepolymer containing 3 wt. % free NCO groups | 550 | — |
| polyether polyol (PPG 2000) prepolymer containing 3 wt. % free NCO groups | — | 400 |
| polyether polyol (P 220) prepolymer containing 3 wt. % free NCO groups | — | 150 |
| MDI (Isonate 143L), drying agent | 40 | — |

-continued

| Ingredients | Amts. of Ingredients, in grams: | |
|---|---|---|
| | Ex. No. 16 | Ex. No. 17 |
| Plasticizing Materials | | |
| chlorinated paraffins (CLP-59) | 300 | 600 |
| asphalt | 600 | 600 |
| coal tar | 300 | — |
| Miscellaneous | | |
| talc | 300 | 300 |
| CaO | 60 | 60 |
| silane | 30 | 30 |
| asbestos | — | 40 |

The above compositions are cured with diamines or with dibutyltin dilaurate and water. The MVT ratings are respectively 0.3 and 0.4 g/day and elongations are well in excess of 100%. The cured compositions are non-volatile.

Some additional general observations can be made respecting the plasticizing materials and polymeric components of the composition. In preparing the composition from hydroxyl-terminated polybutadienes, the use therewith of polyols, for example, polypropylenes, generally improve the elongation of the cured composition without substantially affecting the hydrophobic properties of the composition. With respect to polybutene plasticizing materials, they are very effective in imparting good hydrophobic properties to the composition, but if the plasticizing portion comprises 100 wt. % of the polybutadiene, the cured composition will tend to be tacky. Also, polybutenes tend to be incompatible with some cured polymers. Thus, it is preferred that polybutenes be used in combination with another plasticizing material, and that the polybutene portion thereof be no greater than about 75 wt. %. Although coal tar can comprise 100% of the plasticizing portion, it is preferred that it be used in combination with liquid plasticizers such as chlorinated paraffins which aid in imparting desired viscosity to the uncured mixture and improved elongation and adhesion to the cured composition. The addition of polybutenes to a plasticizing portion comprising coal tar and chlorinated paraffins generally results in improved hydrophobic properties of the composition. Although chlorinated paraffins can comprise 100wt. % of the plasticizing portion, their use thereof generally imparts only moderately improved hydrophobic properties to the cured composition and can tend to leave it tacky. The use of chlorinated paraffins in combination with normally solid resinous materials such as asphalt and coal tar results in a cured composition having an excellent combination of properties. In general, asphalt should comprise no more than about 90 wt. % of the plasticizing portion, and it is desirably used in combination with chlorinated paraffins or phthalates. The further addition of polybutenes to such compositions to counterbalance the chlorinated paraffins improves the hydrophobic properties of the cure composition.

In addition to the aforementioned tests used to evaluate properties of the cured compositions, other tests have also been used. For example, the cured compositions have been evaluated under UV exposure and for wet and dry adhesion and adhesion retention to glass.

In summary, it can be said that the present invention provides the means for the formulation and use of relatively low cost compositions which have an excellent combination of properties of the type required for insulated glass sealants.

I claim:
1. Insulated glass, including as a sealant therefor, a composition comprising a plasticized cured polyurethane or a plasticized cured polyether, said composition having a moisture vapor transmission rating of no greater than about 1 g/day, an elongation of at least about 100% and low volatility.

2. Insulated glass according to claim 1 wherein said polyurethane or said polyether comprises about 20 to about 50 wt. % of said composition and said plasticizing material comprises about 20 to about 60 wt. % of said composition and wherein said moisture vapor transmission rating is no greater than about 0.5 g/day.

3. A plasticized cured composition having a moisture vapor transmission rating of no greater than about 1 g/day, an elongation of at least about 100% and low volatility and comprising:
   A. about 30 to about 40 wt. % of a polyurethane which is the reaction product of a hydroxyterminated polybutadiene and tolylene diisocyanate or methylene bis-(4-phenyl isocyanate);
   B. about 20 to about 35 wt. % of plasticizing material, said material comprising about 3 to about 20 wt. % of coal tar having a distillation point of no lower than about 500° F. or roofing asphalt having substantially no volatiles at temperatures up to about 500° F., and said coal tar and said asphalt having substantially no weight loss for 24 hours at 200° F. or polybutene having a weight loss of about 1% or less when subjected to ASTM D-972 for 10 hours at 210° F. or a mixture thereof, and about 80 to about 97 wt. % of phthalates having a boiling point of 450° F. or higher at 10 mm Hg or aromatic resins or aromatic oil or a mixture thereof;
   C. about 20 to about 35 wt. % of filler;
   D. about 2 to about 6 wt. % of thixotropic agent; and
   E. about 0.5 to about 2.5 wt. % of a glass adhesion promoter.

4. A composition according to claim 3 wherein said polyurethane is prepared by reacting said reaction product with a short chain polyol.

5. Insulated glass including the composition of claim 4 as a sealant therefor and wherein said composition has a moisture vapor transmission rating of no greater than 0.5 g/day.

6. A plasticized cured composition including a cured polyurethane or a cured polyether and wherein said composition has a moisture vapor transmission rating of no greater than about 1 g/day, an elongation of 100% and low volatility and wherein said cured polyurethane or said cured polyether is the reaction product of a water-sensitive polyether including a polyethylene or polypropylene glycol and wherein said composition comprises:
   A. about 30 to about 40 wt. % of said cured polyurethane or said cured polyether;
   B. about 35 to about 55 wt. % of plasticizing material, said material comprising about 25 to about 75 wt. % of coal tar having a distillation point of no lower than about 500° F. or roofing asphalt having substantially no volatiles at a temperature of up about 500° F., and said coal tar and said asphalt having substantially no weight loss for 24 hours at 200° F. or a mixture thereof and about 25 to about 75 wt. % of chlorinated paraffins having a chlorine content of at least about 40–70 wt. % or phthalates having a boiling point of 450° F. or higher at 10 mm Hg or a mixture thereof;

C. about 5 to about 30 wt. % of filler;
D. about 2 to about 6 wt. % thixotropic agent; and
E. about 0.5 to about 2.5 wt. % of a glass adhesion promoter.

7. Insulated glass according to claim 1 wherein said polyurethane or said polyether comprises about 30 to about 45 wt. % of the composition and wherein said plasticizing material comprises about 20 to about 40 wt. % of the composition and wherein said moisture vapor transmission rating is no greater than about 0.5 g/day and said elongation is at least about 200%.

8. Insulated glass according to claim 1 wherein said composition comprises:
A. about 25 to about 50 wt. % of a polyurethane prepared from a hydroxyl-terminated diene polymer; and
B. a plasticizing material,
  a. wherein said plasticizing material comprises about 20 to about 40 wt. % of one or more of the following liquid plasticizers:
    i. a phthalate having a boiling point of no less than about 450° F.;
    ii. a chlorinated paraffin having a chlorine content of at least about 50–70 wt. %;
    iii. polybutene having a molecular weight within the range of about 850 to about 2,500 and exhibiting a weight loss of 1% or lower when subjected to ASTM D-972 for 10 hours at 210° F.; or
  b. wherein said plasticizing material comprises about 30 to about 40 wt. % of a liquid mixture of plasticizing materials, a portion of said mixture comprising one or more of the following:
    i. about 30 to about 60 wt. % of coaltar having substantially no weight loss in 24 hours at 200° F. and a distillation point of no lower than about 500° F.;
    ii. about 30 wt. % of roofing asphalt having substantially no weight loss in 24 hours at 200° F. and having substantially no volatiles at temperatures up to about 500° F.;
    iii. about 20 to about 40 wt. % of aromatic oil;
    iv. about 40 to about 60 wt. % of an aromatic resin; and the remaining portion of said mixture comprising one or more of the liquid plasticizing materials set forth in subparagraphs (i) to (iii) to paragraph (B) (a) herein.

9. Insulated glass according to claim 8 wherein said diene polymer is polybutadiene.

10. Insulated Glass according to claim 8 wherein said phthalate is selected from the group consisting of diisodecyl phthalate and ditridecyl phthalate.

11. Insulated glass according to claim 10 wherein said diene polymer is polybutadiene.

12. Insulated glass according to claim 1 wherein said cured polyurethane or said cured polyether is the reaction product of a water-sensitive polyether including a polyethylene or polypropylene glycol and wherein said composition comprises:
A. about 20 to about 50 wt. % of said cured polyurethane or said cured polyether; and
B. about 40 to about 55 wt. % of a mixture of plasticizing materials, said mixture comprising:
  a. about 50 to about 90 wt. % of coal tar having a distillation point of no lower than about 500° F. or roofing asphalt having substantially no volatiles at temperatures up to 500° F., and said coal tar and said asphalt having substantially no weight loss for 24 hours at 200° F. or a mixture thereof; and
  b. about 10 to about 50 wt. % of one or more of the following liquid plasticizing materials:
    i. a chlorinated paraffin having a chlorine content of at least about 50–70 wt. %;
    ii. a phthalate having a boiling point of no less than about 450° F.;
    iii. polybutene having a molecular weight within the range of about 850 to about 2,500 and exhibiting a weight loss of 1% or lower when subjected to ASTM D-972 for 10 hours at 210° F.; and
    iv. an aromatic oil.

13. Insulated glass according to claim 12 wherein ingredient (A) is said cured polyurethane.

14. A plasticized cured composition having a moisture vapor transmission rating of no greater than about 1 g/day, an elongation of at least about 100% and low volatility and comprising:
(A) about 30 to about 45 wt. % of polyurethane prepared by reacting a prepolymer of hydroxyl-terminated polybutadiene and tolylene diisocyanate with butanediol; and
(B) about 25 to about 35 wt. % of a plasticizing material comprising:
  i. phthalate having a boiling point of 450° F. or higher at 10 mm Hg; or
  ii. a mixture of about 5 to about 95 wt. % of said phthalate and 5 to about 95 wt. % of asphalt having substantially no volatiles at temperatures up to about 500° F. and substantially no weight loss for 24 hours at 200° F.; or
  iii. a mixture of about 5 to about 95 wt. % of said phthalate and about 5 to about 95 wt. % of polybutene having a weight loss of about 1% or less when subjected to ASTM D-972 for 10 hours at 210° F.;
C. about 25 to about 35 wt. % of talc or calcium carbonate filler; and
D. about 0.5 to about 2.5 wt. % of glass adhesion promoter; and
E. about 3 to about 5 wt. % of thixotropic agent.

15. A composition according to claim 14 wherein said phthalate is ditridecyl phthalate or diisodecyl phthalate.

16. Insulated glass including the composition of claim 14 as a sealant therefor.

17. Insulated glass including the composition of claim 15 as a sealant therefor.

18. A composition for use as an insulated glass sealant comprising a plasticized cured polyurethane or a plasticized cured polyether and a plasticizing material, the water absorption properties of the plasticizing material, as determined by ASTM D570, being less than about 0.1 wt. %; and the volatility properties of the plasticizing material being such that the product of
  i. the vapor pressure of the plasticizing material in mm of Hg at 480° F and
  ii. the concentration of the plasticizing material in the composition in wt. % is not greater than about 1200.

19. A composition according to claim 18 wherein said polyurethane or said polyether comprises about 20 to about 50 wt. % of the composition and said plasticizing material comprises about 20 to about 60 wt. % of the composition.

20. Insulated glass including the composition of claim 18 as a sealant therefor.

21. Insulated glass including the composition of claim 19 as a sealant therefor.

22. A composition according to claim 18 in which the cured polymer is said cured polyurethane.

23. A composition according to claim 22 wherein said polyurethane is prepared from a hydroxyl-terminated diene polymer.

* * * * *

UNITED STATES PATENT AND TRADEMARK OFFICE
CERTIFICATE OF CORRECTION

PATENT NO. : 4,063,002
DATED : December 13, 1977
INVENTOR(S) : Floyd Wilson, Jr.

It is certified that error appears in the above-identified patent and that said Letters Patent are hereby corrected as shown below:

Column 8, line 24, after "plasticizing", read --materials--.

Column 8, line 31, "distilled" should read --distillation--

Column 17, line 61, "for" should read --four--.

Column 21, line 38, after "30", read --to about 60--.

Signed and Sealed this

Sixteenth Day of May 1978

[SEAL]

Attest:

RUTH C. MASON
Attesting Officer

LUTRELLE F. PARKER
Acting Commissioner of Patents and Trademarks